July 31, 1945.  K. FREILER  2,380,641
SPOOL FOR RIBBONS AND OTHER NARROW FABRICS
Filed Nov. 9, 1944
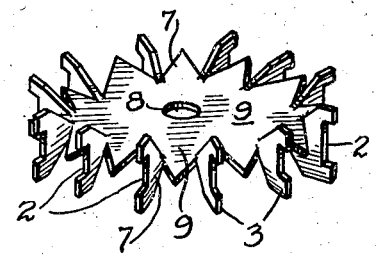
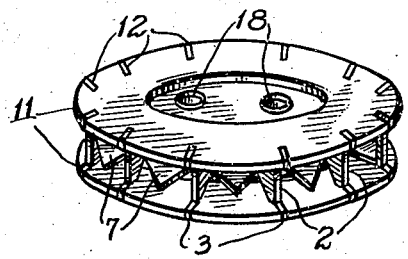
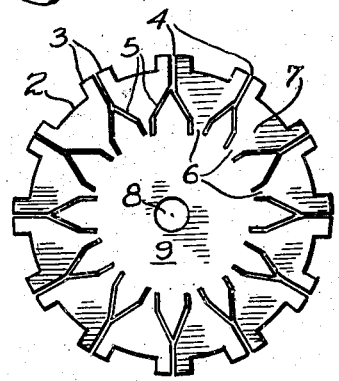
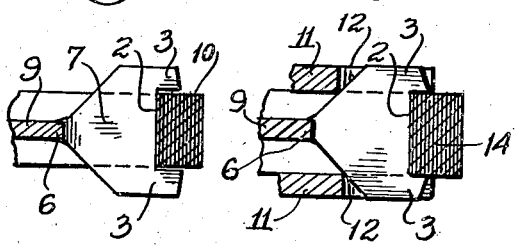
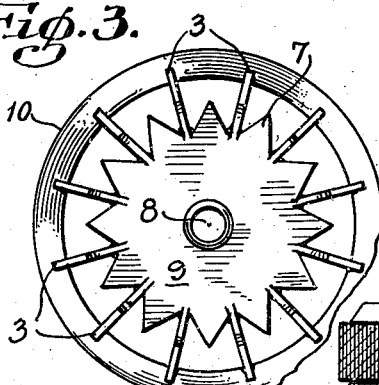
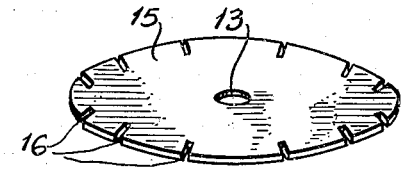
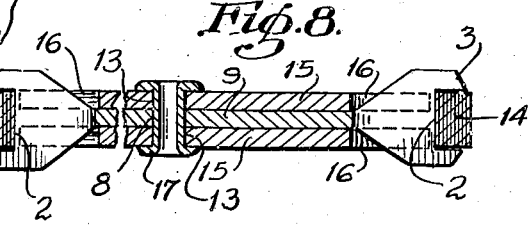
INVENTOR.
Kurt Freiler
BY
ATTORNEY.

Patented July 31, 1945

2,380,641

UNITED STATES PATENT OFFICE 2,380,641

SPOOL FOR RIBBONS AND OTHER NARROW FABRICS

Kurt Freiler, Los Angeles, Calif.

Application November 9, 1944, Serial No. 562,650

4 Claims. (Cl. 242—70)

My invention reates to spool for ribbons and other narrow fabrics, and the purpose of my invention is to provide a low cost spool on which ribbons and narrow fabrics may be wound, and to make this out of sheet material such as pasteboard or other materials which may be manipulated in a similar manner to that of pasteboard, metal or plastics.

By my invention I provide a peculiar construction of a spool which may be made, when desired, out of a single piece of flat material and yet furnish a serviceable spool, and also which may be made out of two or three pieces of flat material into a substantial and desirable form for a spool for the purpose mentioned.

The object of my invention is to make a serviceable spool out of flat sheets of material such as pasteboard or other suitable material, which will be low in cost and will be highly serviceable and convenient for stacking up.

Reference will be had to the accompanying drawing in which:

Figure 1 is a perspective view of one of my forms of a completed spool which is formed out of a flat sheet.

Figure 2 is a plan of a flat sheet by which the spool of Figures 1 and 3 is made.

Figure 3 is a side view of a spool formed from the sheet shown in Figure 2 with ribbon wound thereon.

Figure 4 is a transverse section through one edge of the spool indicated by Figures 1 and 3 in which Figures 3 and 4 a ribbon is shown mounted on the spool.

Figure 5 is a perspective view showing the spool parts as indicated in Figures 1 to 4 inclusive, when those parts are faced on each side with supporting plates of material embossed in central area to contact the plate of Figure 1.

Figure 6 is a perspective view of one of the flat plates as shown mounted in a spool of Figure 8.

Figure 7 indicates a cross section of one edge of the spool of Figure 5 having a ribbon wound thereon. Figure 8 is a section of one form of my spool involving a 3 plate construction.

In the manufacture of my spool I provide a flat sheet of suitable material and with suitable dies I cut it into the shape as shown by Figure 2. This shape provides seats 2 being formed by notches in the periphery of the plate. On each side of the notches 2 there are the projections 3. Between the projections 3 there are cut slits 4 which extend in radial direction toward the center of the plate and these slits 4 are split into two branches 5 cut clear through the plate leaving connected to the body of the plate a narrow width portion 6. Thus making, as it were, small sections 7 connected to the main body of the plate by the narrow portion 6. The plate is provided with the central hole 8.

As and when the plate is prepared as is indicated by Figure 2 it is then placed in a suitable holding form and means are provided for turning the small sections 7 into right angle positions to the body 9 of the plate which then becomes a complete spool upon which tape or narrow widths of ribbons or other narrow widths of fabrics 10 may be wound upon the spool as indicated by Figures 3 and 4. As and when the spool is prepared as is shown by Figures 1 and 3, it may be held in form by the ribbon or by the nature of the material.

When a stronger or more attractive type of spool may be desired I provide one or more plates 11 in which there are notches 12 cut in shape and size adapted to slide over the projections 3 held in frictional or by rivet contact as is indicated in Figures 5 and 7. The shape of the notches 12 are intended to clamp by friction or pinch the projections 3 and thereby hold the plates 11 on each side of the spool body 9 and thereby make a complete unitary spool having holes 13 in the plates 11 which align with the central hole 8 of the middle plate body 9, and this provides a suitable staunch supporting spool for the ribbon 14 shown in section as wound on the spool indicated by Figure 7. On Figures 5 and 7 the plate 11 is dished to have its central area contact the surface 9 of Figures 1, 2 and 3.

In the form shown by Figure 8 the two plates 15 have notches 16 having a radius depth deeper than the notches 12 as indicated in Figures 5 and 7, and this permits the plates 15 to be clamped tightly to the body of plate 9 by any suitable means and is here shown by an eyelet 17 of Figure 8 which is here indicated as being the central hole in the spool.

In the place of the eyelet 17 of Figure 8 we may use 2 eyelets 18 as is shown in Figure 5. Thus by the different forms shown and described herein, different varieties of this type of spools may be made suiting the need of any variety of fabric to be mounted thereon.

The spool may consist of only one sheet of material, as shown by Figures 1, 3 and 4, or it may be provided with double plates, one on each side of the central plate, as is indicated by Figures 5, 7 and 8, in which the plates 15 are clamped tightly to the middle plate 9. However, a good substantial spool is made with one plate 15 clamping the middle body plate 9.

In the manufacture and the mounting of my spool I proceed to cut out with dies the plates as indicated by Figure 2, and then with suitable tools the branches 5 are turned edgewise and held in place when desired until the ribbon is wound thereon which then automatically holds the branches 5 in the position of Figures 1 and 3, the ribbon itself becoming the binder for holding the spool in form.

When the form of spools as shown in Figures 5, 7 and 8 are used, they can be wound without having any support whatever from the fabric wound upon them.

In the use of the spools as shown by the Figures 1 and 3, the material out of which they are made may be of such a quality as to sustain the branches 5 in their fixed position. The blanking and forming may be done in one operation. These spools may be stacked one upon the other when made in those forms, the branches of one spool telescoping between the branches of its adjacent spool when they are stacked up in stock form.

What I claim is:

1. In a spool of the class described a plate circular in outline and notched out with a series of seats in which a ribbon fabric may be inserted, said seats being separated from each other by radial slots thereby forming separate branch segments for each ribbon seat, the said branch segments formed with narrow connections to the body of the plate by divided portions of the aforementioned radial slots extending in an angular direction from the radial lines of the aforementioned slots, thereby leaving the branch segments in which the ribbon seats are located to be twisted to right angle positions to the body of the plate.

2. In a spool of the class described, a single plate circular in outline and notched out into branch segments around its outside and said branch segments twisted to right angle positions to the body of the plate and said segments provided with ribbon seats having radially extending portions on each side of each seat.

3. In a spool of the class described, a disk body having segments extending around the outer portion thereof, said segments bent transversely of the disk forming seats on which strips of materials may be wound, a reinforcing disk clamped to the body of the said first mentioned disk, notches in the outer margin of the said reinforcing disk and said notches having mounted therein the edges of the said transversely aligned segments of the first mentioned disk.

4. In a spool of the class described, a disk body having segments on the outer margin thereof, said segments bent to transverse positions of the body of the disk, companion disks one located on each side of the said segmental disk, notches in the outer margin of the said companion disks, the said segments of the first mentioned disk having their edges mounted into the notches of the companion disks; in combination with means for fastening the central portions of said disks together.

KURT FREILER.